(12) United States Patent
Moore

(10) Patent No.: US 7,813,599 B2
(45) Date of Patent: Oct. 12, 2010

(54) METHOD AND APPARATUS FOR SHAPE AND END POSITION DETERMINATION USING AN OPTICAL FIBER

(75) Inventor: Jason P. Moore, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 12/390,606

(22) Filed: Feb. 23, 2009

(65) Prior Publication Data

US 2010/0215311 A1 Aug. 26, 2010

(51) Int. Cl.
 *G02B 6/00* (2006.01)
 *G01L 1/24* (2006.01)
(52) U.S. Cl. .............................. 385/13; 385/12; 385/37
(58) Field of Classification Search .................... 385/13
 See application file for complete search history.

(56) References Cited

U.S. PATENT DOCUMENTS

| | | | |
|---|---|---|---|
| 5,798,521 | A | 8/1998 | Froggatt |
| 6,256,090 | B1 | 7/2001 | Chen et al. |
| 7,310,456 | B1 | 12/2007 | Childers et al. |
| 7,331,436 | B1 | 2/2008 | Pack et al. |
| 2002/0041722 | A1 | 4/2002 | Johnson et al. |
| 2006/0013523 | A1 | 1/2006 | Childers et al. |
| 2007/0065077 | A1 | 3/2007 | Childers et al. |
| 2007/0297711 | A1 | 12/2007 | Childers et al. |
| 2008/0285909 | A1* | 11/2008 | Younge et al. ................ 385/13 |

OTHER PUBLICATIONS

Klute, S., Duncan, R., Fielder, R., Butler, G., Mabe, J., Sang, A., Seeley, R., Raum, M., "Fiber Optic Shape Sensing & Distributed Strain Measurements on a Morphing Chevron", AIAA 2006-624, 44th AIAA Aerospace Sciences Meeting & Exhibit. Jan. 9-12, 2006, Reno, NV.
Gander et al., "Bend Measurement Using Bragg Gratings in Multicore Fibre", Electron Lett. 36, 120 (2000).
Gray, Alfred, "Modern Differential Geometry of Curves and Surfaces", Boca Raton: CRC Press, Inc. (1993), pp. 11, 125, 156, 127 and 146.
Luna Innovations online press release, "Luna Innovations Signs Multi-Year Development and Supply Agreement with Intuitive Surgical", http://ir.lunainnovations.com/phoenix.zhtml?c=196907&p=irol-newsArticle2&ID=1015478&highlight=, Jun. 14, 2007.

* cited by examiner

*Primary Examiner*—Ryan Lepisto
*Assistant Examiner*—Eric Wong
(74) *Attorney, Agent, or Firm*—Helen M. Galus

(57) ABSTRACT

A method of determining the shape of an unbound optical fiber includes collecting strain data along a length of the fiber, calculating curvature and bending direction data of the fiber using the strain data, curve-fitting the curvature and bending direction data to derive curvature and bending direction functions, calculating a torsion function using the bending direction function, and determining the 3D shape from the curvature, bending direction, and torsion functions. An apparatus for determining the 3D shape of the fiber includes a fiber optic cable unbound with respect to a protective sleeve, strain sensors positioned along the cable, and a controller in communication with the sensors. The controller has an algorithm for determining a 3D shape and end position of the fiber by calculating a set of curvature and bending direction data, deriving curvature, bending, and torsion functions, and solving Frenet-Serret equations using these functions.

25 Claims, 2 Drawing Sheets

METHOD AND APPARATUS FOR SHAPE AND END POSITION DETERMINATION USING AN OPTICAL FIBER

TECHNICAL FIELD

The present invention relates to path sensing using a fiber optic cable, and in particular to a method and apparatus for determining a three-dimensional (3D) shape or path and end position of a multi-core optical fiber.

BACKGROUND OF THE INVENTION

In recent years, attention has been given to the development of single-core and multi-core optical fibers for use as fiber optic shape sensors in a variety of applications. The terms "single-core" and "multi-core" refer to the number of light-guiding cores contained within a surrounding reflective cladding material of a length of fiber optic cable. That is, a single-core optical fiber has a single light-guiding core contained within the reflective cladding of the cable, while a multi-core optical fiber typically has a plurality of substantially identical cores each purposefully arranged in the cladding material. Lengths of optical fibers can be configured with specialized strain sensors and attached to or embedded within a surface of an object, with the various strain measurements used to calculate or estimate the shape of the object.

For example, sensors known as Fiber Bragg Gratings can be formed by laser-inscribing, writing, or otherwise embedding a periodic variation of refractive index into the cores of the optical fiber, thus effectively creating an in-line optical filter designed to block particular wavelengths of light transmitted through or along the core. Likewise, Rayleigh scatter detectors can be used to detect elastic light scatter occurring within a core at specific axial locations of the optical fiber. Using these and/or other strain sensors, the bending geometry at each co-located strain sensor can be determined, with this data used in various ways to approximate the shape of an object to which the cable is attached, or within which the cable is embedded.

When a multi-core fiber optic cable in particular is subjected to bending, the strain imposed in each core depends on the curvature of the bend, the direction of the bend, and the arrangement of the various constituent cores within the cable in relation to the direction of the bending. In accordance with linear elastic tube theory, a light-guiding core positioned on the inside of a bend experiences a stress, i.e., a negative strain, while a core positioned on the outside of the bend experiences a positive strain. The amount of strain is proportional to the bend radius and the position of each core relative to the center of the bend curve. Therefore, multi-core fibers can have additional utility in comparison to single core fibers when used for structural shape sensing and end effecter tracking.

However, conventional fiber optic shape sensing methodologies can be error prone, and therefore can produce less than optimal results. Common methods, including those outlined by S. Klute et al. in "Fiber Optic Shape Sensing & Distributed Strain Measurements on a Morphing Chevron," 44$^{th}$ American Institute of Aeronautics and Astronautics (AIAA) Aerospace Sciences Meeting & Exhibit, #AIAA 2006-624, Jan. 9-12, 2006, Reno, Nev. These methods are highly dependent on the accuracy of successive strain measurements, which are used to calculate the bending parameters of the length of cable at discrete segments thereof. How a particular shape measurement system uses such incrementally-calculated bending parameters to determine shape and end position of a fiber optic cable determines to a large extent the contribution or import of strain measurement error to the final shape determination.

That is, estimated bending parameters of each segment of the cable, or more particularly of each light-guiding core within the optical fiber portion of the cable, are used to discretely determine the location of the next segment, beginning with a calibrated section of cable having a "true" or calibrated spatial location. The strain error at each point along a length of the core or cores is thus directly summed into the final end position measurement, with any twisting of the core or cores in conjunction with the twisting of a bonded protective outer jacket or sleeve exacerbating the error in the calculations, thus leading to less than optimal shape determination.

SUMMARY OF THE INVENTION

Accordingly, a method is provided for determining a three-dimensional (3D) shape of a fiber optic cable in free space, with the method minimizing the inherent shape and end position measurement error of conventional methods such as those disclosed by Klute et al, cited above. The method uses the estimated bend parameters from a plurality of strain sensors embedded in the light-guiding cores of the cable to thereby accurately deduce the shape and end-position of the fiber. The method uses the natural torsion of the cable during bending and the non-summation of strain measurement errors throughout the shape determination process.

In particular, the method includes calculating various torsion, curvature, and bending direction data solutions in conjunction with an applied curve fitting of the measured curvature and bending direction data to obtain explicitly-defined functional solutions to a set of Frenet-Serret formulas, as those equations are known in the art, thus yielding 3D spatial functions describing the propagation of the fiber optic cable in 3D space. With a fixed end position, the other end position can be determined, and thus the position of an object tethered or connected thereto, e.g., a robot, camera, vessel, surgical instrument, tool, or other object as described below.

Within the scope of the method, an unbound multi-core optical fiber is circumscribed by a protective external jacket or sleeve, with the term "unbound" referring to an absence of bonding or other connecting means at or along an interface between the sleeve and an outer coating of the optical fiber within the cable, such that the optical fiber is free to act in the manner of an elastic tube as governed by elastic tube theory. This in turn enables the precise calculation of torsion of the optical fiber, ultimately leading to a relatively accurate 3D shape and end position determination of the optical fiber.

An apparatus is also provided for determining the 3D shape of an optical fiber, with the apparatus including the fiber optic cable, which is unbound as described above, a plurality of strain sensors, e.g., Fiber Bragg Gratings, Rayleigh scatter detectors and/or other suitable strain sensors, and a controller in communication with the strain sensors. In at least one embodiment, the controller has an algorithm for determining the 3D shape of the fiber by calculating an explicitly-defined curvature functions, an explicitly-defined bending direction function, and an explicitly-defined torsion function of the optical fiber using a set of strain data from the sensors. The algorithm performs a predetermined curve-fitting operation on curvature and bending direction data to determine the explicitly-defined functions thereof, and differentiates the bending direction function to determine the torsion function as a function of fiber torsion versus fiber length.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic perspective side view of an apparatus for determining the three-dimensional (3D) shape and end position of an optical fiber in accordance with at least one embodiment of the present invention;

DESCRIPTION OF THE PREFERRED EMBODIMENTS

Figure 1A:
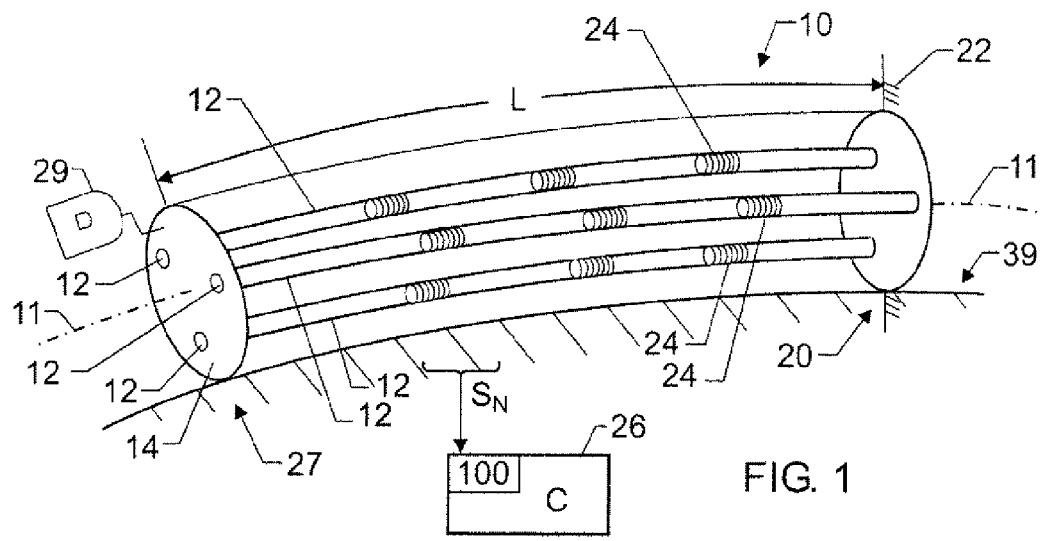
FIG. 1A is a schematic cross-sectional illustration of a fiber optic cable having the optical fiber of FIG. 1, in accordance with at least one embodiment of the present invention.
Figure 1A:
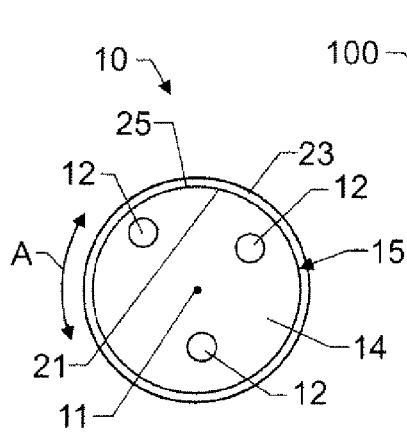

Referring to the drawings wherein like reference numbers represent like components throughout the several figures, and beginning with FIG. 1, an exemplary multi-core fiber optic cable 10 has a longitudinal axis or centerline 11 and a length L. The cable 10 includes a plurality of light-guiding cores 12 each purposefully arranged or positioned with respect to the centerline 11 and surrounded by a layer of reflective cladding material 14. The cores 12 and the cladding material 14 each can be constructed of a suitable polymer, with the cores 12 having a high transparency, and with the cladding material 14 having a low refractive index relative to the cores 12 such that light emitted into one end of each core 12 is efficiently transmitted along the length L of the cable 10 via total internal reflection, as that term is well understood in the art.

Referring briefly to FIG. 1A, as shown, the cable 10 includes an optical fiber 15 having the cores 12, cladding material 14, and a protective polymeric layer or coating 21 bonded to the cladding material 14. The cable 10 also includes a protective outer jacket or sleeve 23 constructed of a suitably rugged or resilient polymeric material, with the sleeve 23 circumscribing the optical fiber 15 along or around the perimeter thereof to form an interface 25. As will be explained below, the optical fiber 15 is "unbound" or free to rotate or twist within the sleeve 23 at or along the interface 25, as indicated by the double arrow A. That is, the sleeve 23 is not bonded, adhered, or otherwise attached to the optical fiber 15 at the interface 25 anywhere along the length L, thereby allowing the optical fiber 15 to freely twist and untwist with respect to the sleeve 23 as needed.

Referring again to FIG. 1, while only three light-guiding cores 12 are shown in FIG. 1 for exemplary purposes, any multiple of cores 12 can be used in conjunction with the method 100 of the invention as set forth in FIG. 2 and described below. In one embodiment, the cores 12 are each positioned substantially equidistant from the centerline 11 and symmetrically with respect thereto, although other configurations can also be used within the scope of the invention. Regardless of the number of cores 12 used in constructing the cable 10, each of the cores 12 are concentrically surrounded by the cladding material 14. For clarity, the cladding material 14 is shown only at the end portions of FIG. 1 in order to clearly show the cores 12 and other internal detail of the optical fiber 15. Likewise, the sleeve 23 of FIG. 1A is omitted from FIG. 1 for further clarity in depicting the cores 12.

The cable 10 includes a plurality of sensors 24 that are inscribed, written, embedded, or otherwise provided at intermittent axial positions along the length L. The sensors 24 are adapted to measure a set of strain data, and to relay the set of strain data, collectively represented in FIG. 1 as $S_N$, to a sensor interrogation device or controller (C) 26. The controller 26 is adapted for determining the shape of the optical fiber 15 via the method 100 as set forth below with reference to FIG. 2 using the strain data $S_N$.

In an example of a potential utility for the cable 10 and method 100 of the invention, 3D shape and/or end position sensing of the cable 10 can be achieved in conjunction with a device 29, such as but not limited to: a piece of minimally invasive surgical (MIS) equipment or a tethered device such as a submersible vessel or other device used in deep ocean exploration, a tethered camera of the type used during on-orbit heat shield tile inspection or other types, tethered robots used for search, rescue, and recovery operations, e.g., in collapsed mineshafts or in structures having compromised stability after an earthquake, etc. To do so, the device 29 is connected to an end 27 of the cable 10, and the sleeve 23 (see FIG. 1A) of the cable 10 in turn is connected to an object 39 such as another set of motion-control cables or wiring used for controlling the direction, operation, and/or motion of the device 29 as needed. The method 100 determines the 3D shape and end position of the optical fiber 15 of FIG. 1A, as set forth below, which can be used for a variety of purposes, including for determining the position of the device 29.

Still referring to FIG. 1, the sensors 24 can be configured as Fiber Bragg Gratings (FBG), although Rayleigh scatter detectors or other strain sensors of the type known in the art can also be used within the scope of the invention. The method 100 can be used independently of the type of fiber used, the type of sensor used, and the type of sensor interrogation system used for controller 26. Likewise, the method 100 can be used with numerous curve-fitting algorithms or models, e.g., linear least squares, non-linear regression, simplex curve-fitting, piecewise polynomial curve-fitting, etc. with a more accurate curve-fitting algorithm ultimately yielding a more accurate and optimal measurement result, as set forth below.

In addition to the end 27, the cable 10 advantageously has a bound end 20 providing a calibrated end position. In other words, the cable 10 can be secured at the bound end 20, such as by attachment to a stationary member 22, such as a surface of a surface, nautical, submersible, or orbital vessel, vehicle, or other device used in conjunction with the device 27, and thus prevented from bending or twisting at the bound end 20. However configured, the bound end 20 represents a fixed initial condition usable by the method 100 for determining a shape of the optical fiber 15, and maintains a known initial tangent vector and a calibrated twist orientation as explained below.

As noted above with reference to FIG. 1A, the optical fiber 15 is unbound or freely-sleeved, i.e., is allowed to freely twist within the sleeve 23 at, along, or with respect to the interface 25 as its own elasticity governs in order to minimize internal stresses along its length L, while also conforming to the turns and bends of the cable 10. Allowing the optical fiber 15 to freely twist and untwist in this manner enables the laws of elastic tube theory to apply, while also permitting explicitly-defined functions of curvature, bending direction, and torsion to follow the known Frenet-Serret curvature equations.

Figure 2:
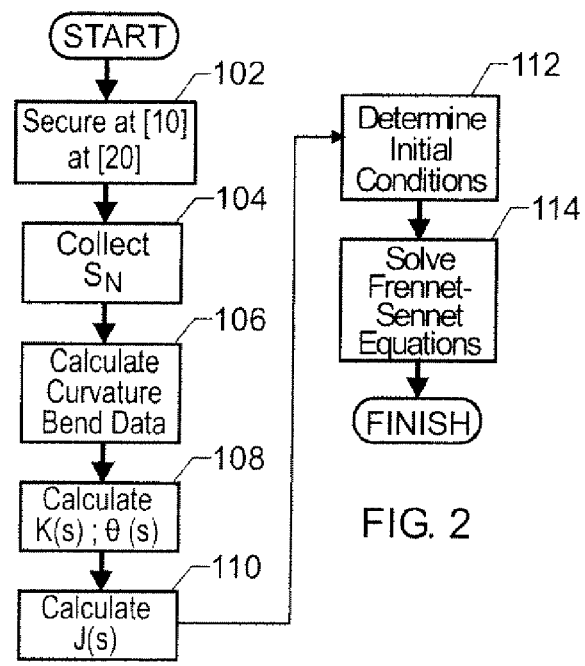
FIG. 2 is a flow chart describing a method for determining the 3D shape of an optical fiber using the apparatus of FIG. 1, in accordance with at least one embodiment of the present invention.

Referring to FIG. 2, with reference to the elements of FIG. 1, the method 100 is provided in algorithmic form to allow the controller 26 to determine a 3D shape solution to various equations. The equations recited below collectively describe the positional data of a fiber in 3D space, thus enabling the calculation of simple (2D) and complex (3D) fiber shapes. The method 100 incorporates the natural torsion of the optical fiber 15 such that the cable 10 can be effectively used for 3D shape sensing and end position determination without utilizing troublesome anti-twist cable mounting arrangements. Sensor data from the sensors 24 is transitioned into usable curvature and torsion equations that are resident within or accessible by the controller 26. The calculations and curve fitting utilized by the method 100 can be accomplished using various commercially available software packages, such as Mathematica 6.0, with appropriate curve fitting methodologies used for processing the curvature and bend direction data being numerous and application-specific.

Key to successful determination of fiber shape using the method 100 is the calibration of the orientation of the cores 12 about the centerline 11 of the cable 10. Also important is the choice of an appropriate initial value of the normal vector or initial bend direction of the cable 10. The bound end 20 is known, typically in zero-curvature orientation, and although there is no curvature orientation, an initial condition must be specified in order for the numerical algorithms to converge to a solution.

The accuracy of the shape determination provided by the method 100 of FIG. 2 is also increased as each of the cores 12 are spaced farther from the centerline 11. Likewise, the accuracy of the method 100 increases in conjunction with the number of cores 12 used in constructing the cable 10. Finally, the physical integrity of the various components of the cable 10, i.e., the cores 12, the cladding material 14, and the sleeve 23, as well as any loosening of the initial condition mounting arrangement as described below with reference to FIG. 2, can ultimately affect the accuracy of the method 100.

Beginning at step 102 of FIG. 2, the method 100 assumes the only "known" position or zero position of the cable 10 is bound. In other words, the cable 10 is secured at this point, i.e., the bound end 20, in a generally straight line, and is not allowed to bend or twist with respect to the bound end 20. The remainder of the cable 10 forms the effective shape sensing portion of the cable 10, is not bound in position, and as noted above the optical fiber 15 is unbound with respect to the sleeve 23 and thus allowed to freely twist and untwist within the sleeve 23. The method 100 then proceeds to step 104.

At step 104, strain information ($S_N$) is gathered or collected from the sensors 24 and relayed to the controller 26. The method 100 then proceeds to step 106.

At step 106, the raw or uncorrected curvature data and bending direction data of the cable 10 is deduced using the strain information from step 104. In particular, discrete curvature and bending data is calculated using any suitable methods, for example those outlined in Klute et al, as cited hereinabove. The curvature ($\kappa$) and the bend radius (R) are inversely proportional, and therefore if bend radius (R) is determined, an inversion can be performed in order to determine the curvature ($\kappa$).

Briefly, the discrete curvature data can therefore be represented as $\kappa(s_{i=1}^{i=N})=R(s_i)^{-1}$, where grating triplets, i.e., groupings of three similarly-positioned sensors 24 for each of the three cores 12 in the exemplary optical fiber 15 of FIG. 1, are numbered by i and there are N number of grating triplets along the fiber at distance $s_i$. The discrete bend direction data set can be represented as $\theta(s_{i=1}^{i=N})$. Within the scope of the method 100, it is important to recognize the physical limits to torsion, i.e., the rate of change of the bend direction data. Depending on the algorithms or software used to compute bend direction, torsion may be non-continuous in its raw form. For this discussion, it is assumed that torsion should not exceed ±π; therefore, it may in some applications be necessary to "unwrap" or correct the discrete bend direction data to meet this criteria, a process which can be accomplished a variety of ways as will be understood by those of ordinary skill in the art.

Figure 3:
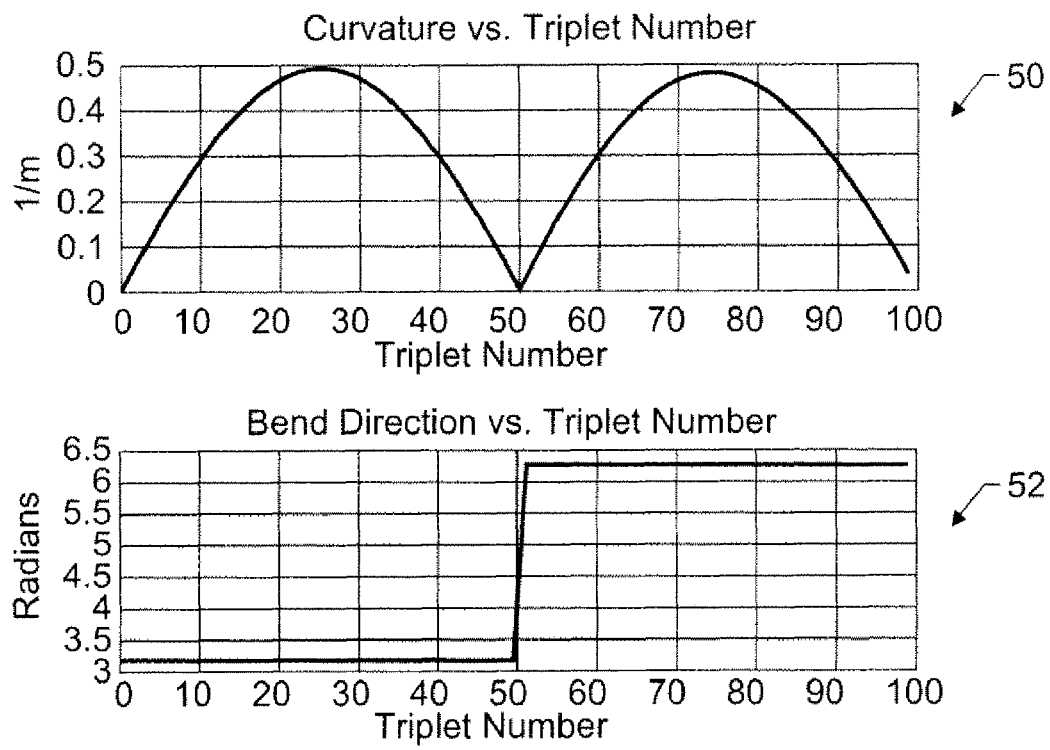
FIG. 3 is a set of graphs describing uncorrected curvature and bending direction data.

Referring briefly to FIG. 3, the continuity of the bend direction should be ensured to allow for accurate curve fitting of bend direction and curvature data. As an example of bend direction discontinuity, consider a fiber having 100 triplets along a length L which is bent to form an "s" shape in a single plane. The curvature and bend direction data can have an abrupt, discontinuous change at triplet number 50, i.e., halfway through the s-shape bend, as represented in the upper graph 50 and lower graph 52 of FIG. 3. In FIG. 3, the upper graph 50 represents the curvature vs. triplet number, while the lower graph 52 represents the bend direction vs. triplet number, as will be understood by those of ordinary skill in the art. The numerical solution process of step 106 of FIG. 2 allows for negative curvature, so in a case like this one, it is useful to "correct" the data.

Figure 4:
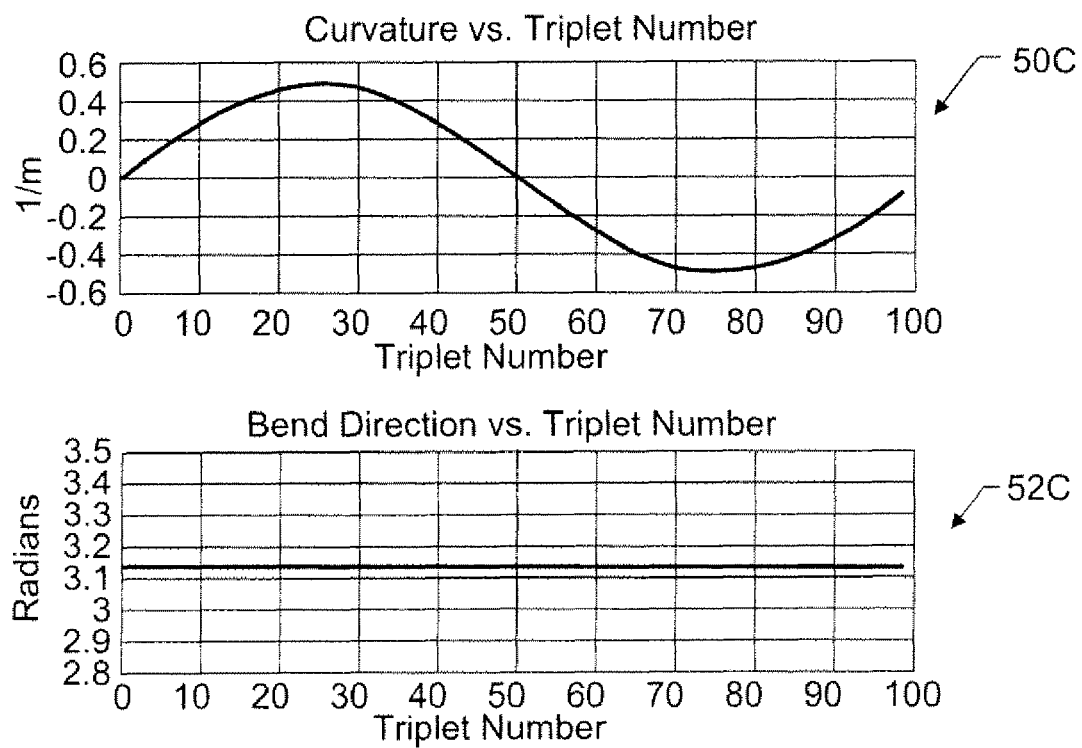
FIG. 4 is a set of graphs describing the corrected curvature and bending direction data.

One way of doing so is to test the discrete bend direction data set for discrete torsion (change in bend direction) having a magnitude greater than π/2, and if this is the case, subtract or add π (depending on positive or negative torsion) to the discontinuous data and negate the curvature data from that point in the data forward. The data shown above would be "corrected" as shown in the corrected upper and lower graphs 50C and 52C, respectively, in FIG. 4. Once the discrete curvature set and the discrete bend angle set numerical values are calculated and corrected as explained above, the method 100 proceeds to step 108.

Referring again to FIG. 2, at step 108, using the curvature and bending information data sets $\kappa(s_{i=1}^{i=N})$ and $\theta(s_{i=1}^{i=N})$ from step 104 as set forth above, the equations for $\kappa(s)$ and $\theta(s)$ are curve-fitted using any appropriate curve-fitting algorithm or function to determine a set of explicitly-defined curvature and bending direction functions, i.e.,:

$$\kappa(s)=\text{Fit}[\{\kappa(s_{i=1}^{i=N}), s_{i=1}^{i=N}\}]$$

$$\theta(s)=\text{Fit}[\{\theta(s_{i=1}^{i=N}), s_{i=1}^{i=N}\}]$$

After curve-fitting in step 108, which also effectively and indirectly "smoothes" any error in the strain measurements collected at step 104, the algorithm 100 then proceeds to step 110.

At step 110, the method 100 differentiates the bending information data $\theta(s)$ to determine an explicitly-defined torsion function as a function of torsion versus fiber length, i.e., $\tau(s)=\theta'(s)$. The method 100 then proceeds to step 112.

At step 112, using the known initial conditions:

$x(0), y(0), z(0), T_x(0), T_y(0), T_z(0), N_x(0), N_y(0), N_z(0), B_x(0), B_y(0), B_z(0)$, the initial position condition is determined by the location of the "zero" length of sensing fiber, and is typically specified as $\{x(0), y(0), z(0)\}=\{0,0,0\}$. The initial tangent vector $\vec{T}(0)$ is also dependent on the orientation of the "zero" length in space. It represents the direction the fiber is pointing at the "zero" length fiber point.

As noted above, an important consideration in the use of the method 100 of the invention is the choice of appropriate initial value of the normal vector, or the initial bend direction. The cable 10 is bound at bound surface 20, as shown in FIG. 1, typically in a zero curvature orientation. Although curvature is absent at the bound end 20 of the cable 10, an initial condition must be specified in order for the numerical algorithms to converge to a solution. Using the curve fitted equation of bend direction with a distance argument of zero, or s=0, gives an optimal initial condition of bend direction. This information is used to specify the initial conditions of the normal vector {N$_x$(0),N$_y$(0), N$_z$(0)}. The initial normal vector $\vec{N}(0)$ is determined using the curve-fit equation θ(s) found above at step 108. Setting s=0 gives the direction of the normal at the "zero" length fiber point. By rule, the normal vector is perpendicular to the tangent vector. For example, if the orientation of the "zero" length in space dictated that the initial tangent vector was $\vec{T}(0)$={1, 0, 0}, then the initial normal vector can be found using $\vec{N}(0)$={0,cos(θ(0)),sin(θ(0))}. The initial binormal vector $\vec{B}(0)$ is found from the cross product $\vec{B}(0)=\vec{T}(0)\times\vec{N}(0)$. Specifying an initial normal vector which does not match the measured data can result in shape measurement error. After completing step 112, the method 100 proceeds to step 114.

At step 114, the method 100 includes solving the Frenet-Sennet equations outlined by Grey, as cited above:

$$T_x'(s)=\kappa(s)N_x(s)$$

$$T_y'(s)=\kappa(s)N_y(s)$$

$$T_z'(s)=\kappa(s)N_z(s)$$

$$N_x'(s)=-\kappa(s)T_x(s)+\tau(s)B_x(s)$$

$$N_y'(s)=-\kappa(s)T_y(s)+\tau(s)B_y(s)$$

$$N_z'(s)=-\kappa(s)T_z(s)+\tau(s)B_z(s)$$

$$B_x'=-\tau(s)N_x(s)$$

$$B_y'=-\tau(s)N_y(s)$$

$$B_z'=-\tau(s)N_z(s)$$

$$x'(s)=T_x(s);$$

$$y'(s)=T_y(s);$$

$$z'(s)=T_z(s).$$

The method is then complete, as the path or shape of the optical fiber 15 is now known from the solution, which gives the position {x(s), y(s), z(s)}, tangent vector {T$_x$(s),T$_y$(s), T$_z$(s)}, normal vector {N$_x$(s), N$_y$(s), N$_z$(s)}, and bi-normal vector {B$_x$(s),B$_y$(s),B$_z$(s)}; s represents the distance along the fiber.

Accordingly, the method 100 of FIG. 2 when used in conjunction with the cable 10 of FIG. 1, i.e., with an unbound or freely twisting fiber 15 having multiple cores 12, then the natural torsion of the optical fiber 15 can be used as an integral component of the calculations provided herein to accurately determine the 3D shape of the optical fiber 15, and thus the shape or end position of an object or device connected to the cable 10.

The unbound nature of the optical fiber 15 at its interface 25 with the sleeve 23 of FIG. 1 enables the optical fiber 15 to be treated as an elastic tube, which then allows for execution of the numerical solutions of the method 100 of FIG. 2 using elastic tube theory. That is, the method 100 accounts for the torsion component of the optical fiber 15 associated with natural elastic tube theory, unlike prior art methods having bonded fiber-jacket or fiber-sleeve interfaces that force the fiber to twist in conjunction with the sleeve, but with torsion contribution of the fibers themselves largely ignored. Therefore, the method 100 disposes of much of the problematic calculation error of the prior art as explained above.

While the best modes for carrying out the invention have been described in detail, those familiar with the art to which this invention relates will recognize various alternative designs and embodiments for practicing the invention within the scope of the appended claims.

What is claimed as new and desired to be secured by Letters Patent of the United States is:

1. A method of determining the shape of a fiber optic cable having an optical fiber and a protective sleeve, wherein the optical fiber is fully circumscribed by the protective sleeve and is unbound along the entirety of an interface with the protective sleeve to thereby allow the optical fiber to freely twist and untwist within the protective sleeve only in accordance with its own elasticity, the method comprising:
    securing the fiber optic cable to a stationary member at a first end of the fiber optic cable to provide a calibrated end position, wherein said securing prevents the cable from bending or twisting at the first end;
    collecting strain data at a plurality of different positions along a length of the optical fiber and forming a data set thereof;
    calculating a set of curvature data and a set of bending direction data of the optical fiber using said set of strain data;
    deriving an explicitly-defined curvature function for said set of curvature data and an explicitly-defined bending direction function for said set of bending direction data by applying a curve-fitting operation to a respective one of said set of curvature data and said bending direction data;
    deriving an explicitly-defined torsion function resultant of the natural elasticity of the optical fiber using said bending direction function;
    determining an initial condition of a normal vector of the first end of the fiber optic cable as a function of the calibrated location of said first end; and
    determining the shape and a position of a second end of the fiber optic cable using each of said initial condition of said normal vector, said bending direction function, said curvature function, and said torsion function.

2. The method of claim 1, wherein collecting strain data includes directly sensing said set of strain data using one of a plurality of strain sensors.

3. The method of claim 1, wherein collecting strain data includes collecting data from a group of substantially co-located sensors at each of said plurality of positions.

4. The method of claim 2, wherein each sensor is one of inscribed, written, embedded, or otherwise provided along a light-guiding core of said optical fiber.

5. The method of claim 3, wherein each of said sensors in a particular group is associated with a corresponding light-guiding core of said optical fiber, and wherein each of said cores is positioned substantially equidistant from a centerline of said optical fiber, and substantially symmetrically with respect thereto.

6. The method of claim 1, wherein deriving an explicitly-defined torsion function includes differentiating said bending direction function to thereby determine said torsion function.

7. The method of claim 1, wherein determining the shape of the fiber optic cable includes calculating solutions to a set of Frenet-Serret formulas using each of said bending direction function, said curvature function, and said torsion function.

8. The method of claim 1, further comprising: attaching the fiber optic cable to a device, and actively determining a position of said device using the shape of the fiber optic cable.

9. A method of determining a three-dimensional (3D) shape of a fiber optic cable having an optical fiber with a plurality of light-guiding cores, the optical fiber being circumscribed by a protective sleeve, wherein the sleeve is not bonded to the fiber anywhere along the length of the fiber, and with respect to which the optical fiber is allowed to freely twist and untwist along an interface therewith only in accordance with its own elasticity, the method comprising:
   securing the fiber optic cable to a stationary member at a first end of the fiber optic cable to provide a calibrated end position, wherein said securing events the cable from bending or twisting at the first end;
   measuring strain data at a plurality of different positions along a length of the fiber optic cable using a plurality of strain sensors, at least one of which is configured as one of: a Fiber Bragg Grating (FBG) and a Rayleigh scatter detector, and forming a data set thereof;
   calculating a set of curvature data and a set of bending direction data using said set of strain data;
   performing a curve-fitting operation on said set of curvature data and said set of bending direction data to determine an explicitly-defined bending direction function, an explicitly-defined curvature function, and an explicitly-defined torsion function. wherein said bending direction function is differentiated to thereby derive said torsion function;
   deriving an explicitly-defined torsion function resultant of the natural elasticity of the optical fiber using said bending direction function;
   determining an initial condition of a normal vector of the first end of the fiber optic cable as a function of the calibrated location of said first end; and
   determining the 3D shape of the optical fiber and a position of a second end of the optical fiber using each of said initial condition of said normal vector, said bending direction function, said curvature function, and said torsion function.

10. The method of claim 9, wherein determining the 3D shape of the optical fiber includes calculating solutions to a set of Frenet-Serret formulas using said bending direction function. said curvature function, and said torsion function.

11. The method of claim 9, wherein measuring strain data at a plurality of different positions includes collecting data from a group of substantially co-located sensors at each of the plurality of positions.

12. The method of 11, wherein each sensor in a particular group is associated with a corresponding one of the light-guiding cores, and wherein each of said cores is positioned substantially equidistant from a centerline of said optical fiber, and substantially symmetrically with respect thereto.

13. The method of claim 9, wherein the second end of said fiber optic cable is attachable to a device such that the position of the device can be determined from the 3D shape of the optical fiber.

14. The method of claim 13, wherein the device is a tethered device selected from the group consisting essentially of: a tethered submersible vessel, a tethered camera, and a tethered robot.

15. The method of claim 9, wherein said performing a curve-fitting operation on said set of curvature data and said set of bending direction data includes performing at least one of: linear least squares, non-linear regression, simplex curve-fitting, and piecewise polynomial curve-fitting.

16. An apparatus for determining a three-dimensional (3D) shape of a multi-core optical fiber, the apparatus comprising:
   a fiber optic cable adapted for attachment to a device only at a second end of said fiber optic cable, said cable being secured to a stationary member at a first end of said fiber optic cable to provide a calibrated end position, and preventing said fiber optic cable from bending or twisting at said first end, the fiber optic cable further including a multi-core optical fiber, a protective sleeve circumscribing said fiber, and a plurality of strain sensors positioned along a longitudinal axis of said fiber and adapted for gathering a set of strain data thereof, wherein said set of strain data includes a set of curvature data and a set of bending direction data of said fiber, said fiber being unbound along the entirety of an interface with said protective sleeve to thereby allow said fiber to freely twist and untwist with respect to said protective sleeve only in accordance with its own elasticity; and
   a controller in communication with said plurality of strain sensors, said controller having an algorithm which is executable by the controller to calculate the 3D shape of said fiber and a position of said device at said second end from said set of strain data, wherein execution of said algorithm by the controller calculates the 3D shape and position by:
      deriving an explicitly-defined curvature function for said set of curvature data and an explicitly-defined bending direction function for said set of bending direction data by applying a curve-fitting operation to a respective one of said set of curvature data and said bending direction data;
      deriving an explicitly-defined torsion function resultant of the natural elasticity of the optical fiber using said bending direction function;
      determining an initial condition of a normal vector of the calibrated end position of the first end of the fiber optic cable as a function of the location of the second end of the fiber optic cable; and
      determining the shape of the fiber optic cable using each of said normal vector, said bending direction function, said curvature function, and said torsion function.

17. The apparatus of claim 16, wherein said controller uses said algorithm to derive a torsion function using a curve-fitted bending direction function of said set of bending direction data.

18. The apparatus of claim 17, wherein said controller uses said algorithm for differentiating said bending direction function to thereby determine said torsion function as a function of a length of the optical fiber.

19. The apparatus of claim 16, wherein said plurality of strain sensors are divided into groups of substantially co-located sensors, with one group being disposed at each of a plurality of positions along the longitudinal axis of said fiber.

20. The apparatus of claim 16, wherein each of said plurality of strain sensors is one of inscribed, written, embedded, or otherwise provided in a position along one of said cores of said optical fiber.

21. The apparatus of claim 19, wherein each sensor in a particular group is associated with a corresponding core, and wherein each of said cores is positioned substantially equidistant from a centerline of said optical fiber, and substantially symmetrically with respect thereto.

22. The apparatus of claim 16, wherein said plurality of strain sensors are selected from the group consisting essentially of: Fiber Bragg Gratings and Rayleigh scatter detectors.

23. The apparatus of claim 16, wherein when the first end of the fiber optic cable is collocated with a tethered device, and wherein the apparatus is operable for determining a position of the tethered device using the 3D shape of the optical fiber.

24. The apparatus of claim 16, wherein calculating the 3D shape includes calculating solutions to a set of Frenet-Serret formulas.

25. The apparatus of claim 16 wherein said fiber optic cable comprises cladding material surrounding said cores, and a protective layer or coating bonded to said cladding material.

* * * * *